United States Patent
Masamura

(10) Patent No.: US 11,653,107 B2
(45) Date of Patent: May 16, 2023

(54) IMAGE PICK UP APPARATUS, IMAGE PICK UP METHOD, AND STORAGE MEDIUM

(71) Applicant: CANON KABUSHIKI KAISHA, Tokyo (JP)

(72) Inventor: Takuya Masamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/455,390

(22) Filed: Nov. 17, 2021

(65) Prior Publication Data

US 2022/0166929 A1     May 26, 2022

(30) Foreign Application Priority Data

Nov. 24, 2020    (JP) ............................. JP2020-194436

(51) Int. Cl.
     *H04N 5/232*      (2006.01)
     *G02B 7/38*      (2021.01)
     *H04N 5/235*      (2006.01)

(52) U.S. Cl.
     CPC ......... *H04N 5/232125* (2018.08); *G02B 7/38* (2013.01); *H04N 5/2353* (2013.01)

(58) Field of Classification Search
     CPC ... H04N 5/232125; H04N 5/2353; G02B 7/38
     See application file for complete search history.

(56) References Cited

U.S. PATENT DOCUMENTS

| | | | |
|---|---|---|---|
| 9,083,880 B2 | 7/2015 | Shimamoto | |
| 9,473,698 B2 | 10/2016 | Muto | |
| 2008/0170847 A1* | 7/2008 | Flannery | ................ H04N 5/238 396/222 |
| 2013/0314586 A1 | 11/2013 | Shimamoto | |
| 2014/0146140 A1* | 5/2014 | Shimamoto | .......... H04N 13/296 348/46 |
| 2015/0326798 A1 | 11/2015 | Muto | |
| 2017/0142344 A1* | 5/2017 | Matsunaga | ........ H04N 5/23212 |
| 2018/0191935 A1* | 7/2018 | Chang | .................. H04N 5/2353 |
| 2018/0364451 A1 | 12/2018 | Sumihiro | |

FOREIGN PATENT DOCUMENTS

| | | |
|---|---|---|
| JP | 2015216532 A | 12/2015 |
| WO | 2012117733 A1 | 7/2012 |

* cited by examiner

*Primary Examiner* — Ahmed A Berhan
(74) *Attorney, Agent, or Firm* — Canon U.S.A., Inc. IP Division

(57) ABSTRACT

An image pick up apparatus includes an image sensor configured to pick up an image while changing an in-focus position during pickup of the image, at least one memory configured to store instructions, and at least one processor coupled to the at least one memory and configured to execute the instructions to perform a correction of a difference in exposure resulting from a change in the in-focus position while one image is picked up.

21 Claims, 8 Drawing Sheets

IMAGE PICK UP APPARATUS, IMAGE PICK UP METHOD, AND STORAGE MEDIUM

BACKGROUND OF THE INVENTION

Field of the Invention

The present invention relates to an image pick up apparatus involving reduction of a difference in exposure between images.

Description of the Related Art

In a case where a plurality of subjects at greatly different distances from a digital camera or the like is imaged or a subject having a great depth dimension is imaged, only some of the subjects or only a portion of the subject can be in focus due to a lack of depth of field. To solve such an issue, Japanese Patent Application Laid-Open No. 2015-216532 discusses a technique for focus stacking by which a plurality of images is picked up at different in-focus positions, only focused areas are extracted from the picked-up images, and the focused areas are combined into one image, thereby generating a composite image in which an entire imaging area is in focus.

Meanwhile, in order to reduce processing time for focus stacking as much as possible, International Publication No. 2012/117733 discusses a technique for continuously changing the in-focus position during exposure.

However, if imaging is performed while moving the in-focus position during exposure as described above, uneven luminance is caused in a plane of the image due to changes in effective aperture value between timings of exposure of an upper part and a lower part of an imaging element. If only focused areas are extracted from a plurality of images picked up in this manner and combined into one image, a boundary between combined areas may become noticeable due to uneven luminance and may cause defects in the composite image.

SUMMARY OF THE INVENTION

The present invention is directed to, in the case of moving the in-focus position during exposure in imaging for focus stacking, reducing defects in the composite image.

According to an aspect of the present invention, an image pick up apparatus includes an image sensor configured to pick up an image while changing an in-focus position during pickup of the image, at least one memory configured to store instructions, and at least one processor coupled to the at least one memory and configured to execute the instructions to perform a correction of a difference in exposure resulting from a change in the in-focus position while one image is picked up.

In the configuration of an exemplary embodiment of the present invention, it is possible to obtain a focus-stacked image in which defects at a boundary between combined areas caused by uneven luminance and a difference in level of noise are reduced while reducing the imaging time for picking up a plurality of images having different in-focus positions.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the drawings. The following exemplary embodiments are not intended to limit the present invention described in the claims, and not all combinations of features described in the exemplary embodiments are necessarily essential to a solution of the present invention.

Figure 1:
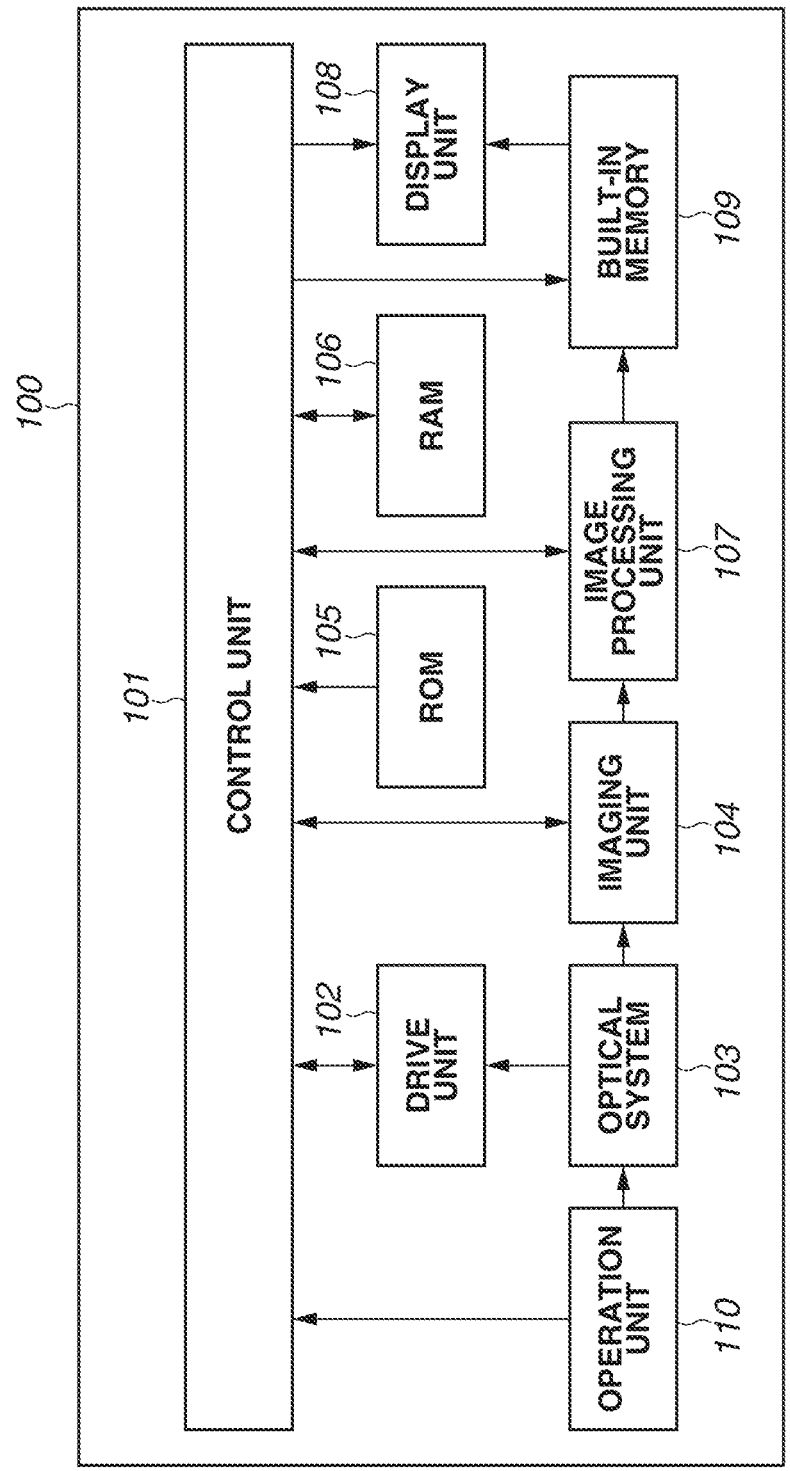
FIG. 1 is a block diagram illustrating a hardware configuration of a digital camera that is an image pick up apparatus according to an exemplary embodiment of the present invention.

FIG. 1 is an example of a block diagram illustrating a configuration of a digital camera that is an image pick up apparatus according to the present exemplary embodiment. A digital camera 100 is capable of picking up still images, recording information on in-focus positions, calculating contrast values, and combining images. The digital camera 100 is further capable of enlarging or reducing an image that has been picked-up and saved or an externally input image.

A control unit 101 is a signal processor such as a central processing unit (CPU) and a micro processing unit (MPU). The control unit 101 reads a program built in a read only memory (ROM) 105 described below to control each unit of the digital camera 100. For example, as described below, the control unit 101 issues commands for starting and ending image pickup to an imaging unit 104 described below. Alternatively, the control unit 101 issues a command for image processing based on the program built in the ROM 105 to an image processing unit 107 described below. A command issued by a user is input into the digital camera 100 via an operation unit 110 described below, and reaches the corresponding unit of the digital camera 100 via the control unit 101.

A drive unit 102 includes a motor or the like, and mechanically operates an optical system 103 described below under commands from the control unit 101. For example, the drive unit 102 moves the position of a focus lens included in the optical system 103 based on commands from the control unit 101, thereby adjusting a focal length of the optical system 103.

The optical system 103 includes a zoom lens, a focus lens, and a diaphragm. The diaphragm is a mechanism for adjusting an amount of light transmitted. The in-focus position can be changed by changing the positions of the lenses.

The imaging unit 104 is an imaging element that photoelectrically converts an incoming light signal into an electric signal. For example, the imaging unit 104 may be a charge-coupled device (CCD) sensor, a complementary metal-oxide semiconductor (CMOS) sensor, or the like. The imaging unit 104 can be provided with a moving image pickup mode in which a plurality of temporally continuous images is picked up as frames of a moving image. The imaging unit 104 can measure luminance of a subject through the optical system 103. Instead of the imaging unit 104, an autoexposure (AE) sensor or the like may be used for light metering.

The ROM 105 is a read-only non-volatile memory as a recording medium, and stores operational programs for blocks included in the digital camera 100 and parameters necessary for operation of the blocks.

The RAM 106 is a writable volatile memory that is used as a temporary storage area of data output by the operation of the blocks included in the digital camera 100.

The image processing unit 107 performs various types of image processing such as white balance adjustment, color interpolation, filtering, and combining on image data output from the imaging unit 104 or on image signal data recorded in a built-in memory 109 described below. The image processing unit 107 compresses the image signal data picked up by the imaging unit 104 using standards such as JPEG.

The image processing unit 107 includes an application specific integrated circuit (ASIC) in which circuits performing specific processes are integrated. Alternatively, the control unit 101 may perform the processes based on the programs read from the ROM 105, whereby the control unit 101 performs some or all of the functions of the image processing unit 107. If the control unit 101 performs all of the functions of the image processing unit 107, the image processing unit 107 does not need to be provided as hardware.

A display unit 108 is a liquid crystal display or an organic electroluminescence (EL) display that displays an image temporarily saved in the RAM 106, an image saved in the built-in memory 109 described below, or a setting screen for the digital camera 100.

The built-in memory 109 is an area to record images picked up by the imaging unit 104, images processed by the image processing unit 107, and the information on in-focus positions in image pickup. Instead of the built-in memory 109, a memory card or the like may be used.

The operation unit 110 includes, for example, a button, a switch, a key, or a mode dial attached to the digital camera 100 or a touch panel used also as the display unit 108. The commands from the user reach the control unit 101 via the operation unit 110.

Next, a reason why uneven luminance occurs in a plane of an image if the image is picked up while the in-focus position is moved during exposure using a rolling shutter, will be described with reference to the drawings.

When the digital camera 100 is in a manual exposure mode or an aperture priority exposure mode, the user can use the operation unit 110 to set the aperture value to the digital camera 100. When the digital camera 100 is in an auto mode or a shutter speed priority mode, the digital camera 100 automatically determines the aperture value. The aperture value set by the user to the digital camera 100 is called a displayed aperture value or nominal aperture value.

The digital camera 100 instructs the drive unit 102 via the control unit 101 to change the aperture of the optical system 103 to an aperture value set by the user or automatically determined by digital camera 100. However, even if the aperture of the optical system 103 is changed to the displayed aperture value, an actual amount of light received by the imaging unit 104 through the optical system 103 depends on a positional relationship between the optical system 103 and the imaging unit 104. Thus, the imaging unit 104 may not receive an amount of light corresponding to the displayed aperture value. The actual amount of light received by the imaging unit 104 represented in terms of the aperture value is an effective aperture value. The actual aperture value is called the effective aperture value.

In general, however, a lens has a characteristic of changing the effective aperture value thereof when the in-focus position is moved, and the actual aperture value of the lens may be different from the displayed aperture value depending on the state of the lens. A difference between the displayed aperture value and the effective aperture value depends on the position of a focus lens, i.e., the in-focus position. In focus stacking imaging, a rolling shutter is often used to pick up a large number of images. In image pickup using the rolling shutter, pixel reset and pixel read are performed in sequence for each line, and thus the exposure timing gradually shifts from line to line. Exposure times of pixels in each line are basically the same.

Figure 2:
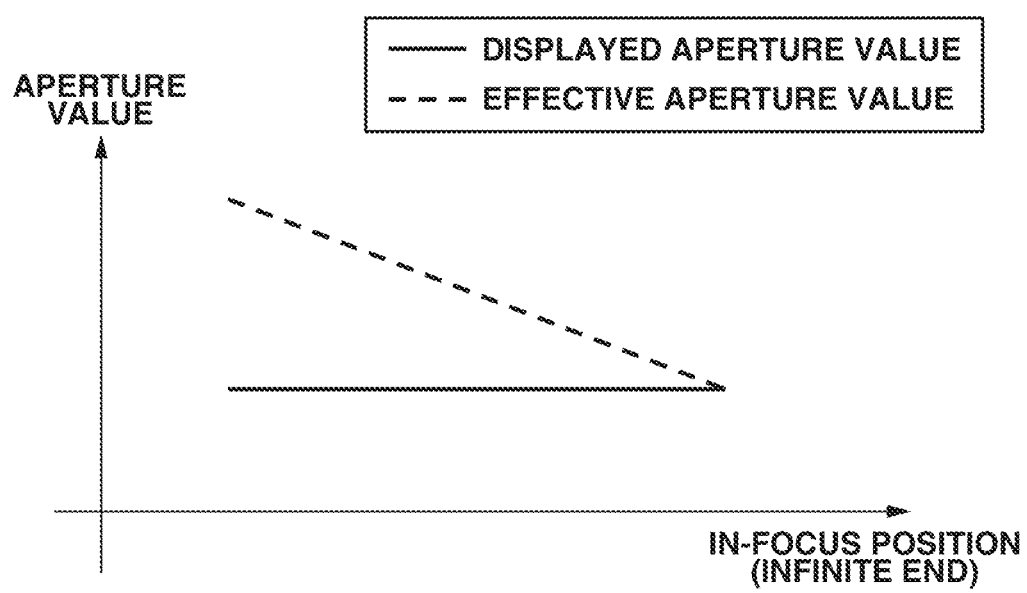
FIG. 2 is a graph illustrating a relationship among a displayed aperture value, an effective aperture value, and an in-focus position according to the exemplary embodiment of the present invention.

FIG. 2 is a graph illustrating a relationship among the displayed aperture value, effective aperture value, and in-focus position according to the present exemplary embodiment. As illustrated in the graph of FIG. 2, in the optical system 103 according to the present exemplary embodiment, if the in-focus position is at the closest distance end, the effective aperture value is greater than the displayed aperture value, and as the in-focus position becomes closer to the infinite end, the effective aperture value becomes closer to the displayed aperture value. However, whether changes in the effective aperture value due to the in-focus position are linear or non-linear and monotonic increase or monotonic decrease, and an absolute amount of difference from the displayed aperture value differ depending on the type of the lens. The relationship between the effective aperture value and the in-focus position illustrated in FIG. 2 is a mere example.

Figure 3:
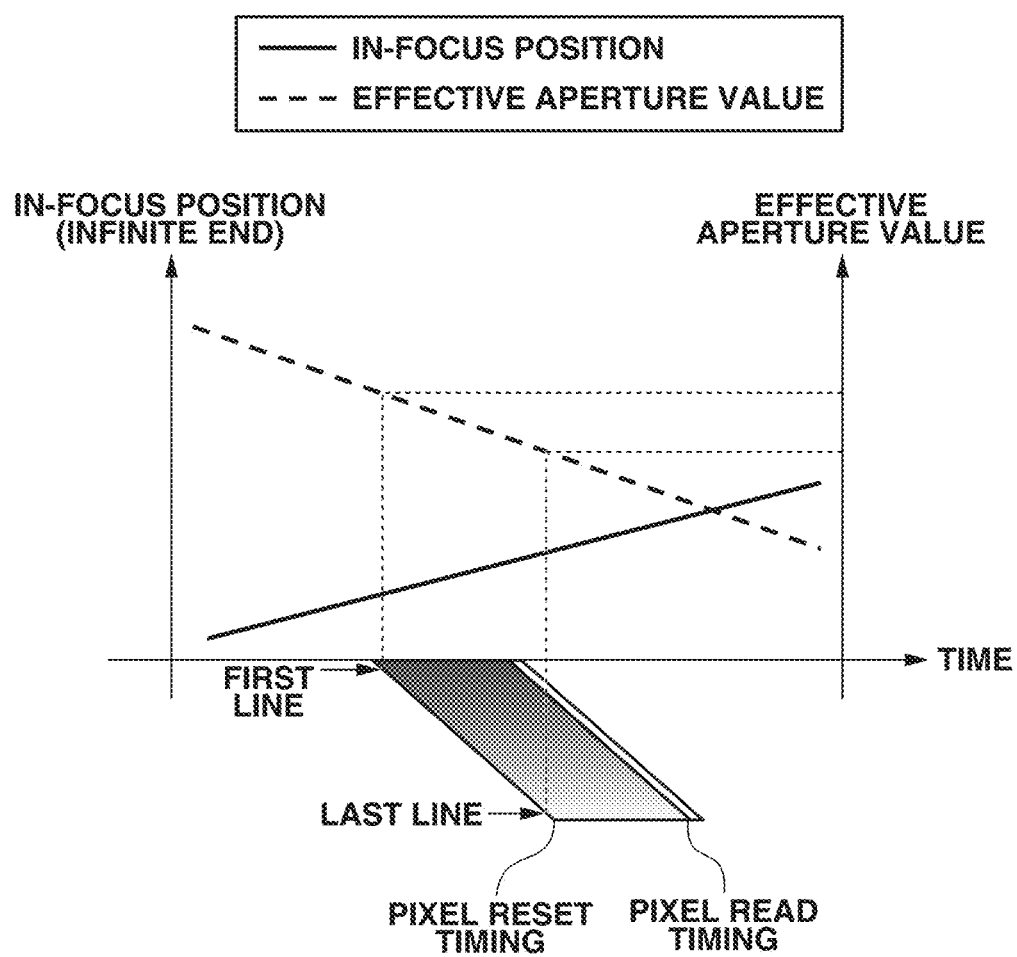
FIG. 3 is a graph illustrating a relationship between changes in effective aperture value due to changes in in-focus position and an exposure timing without correction of exposure time according to the exemplary embodiment of the present invention.
Figure 4:
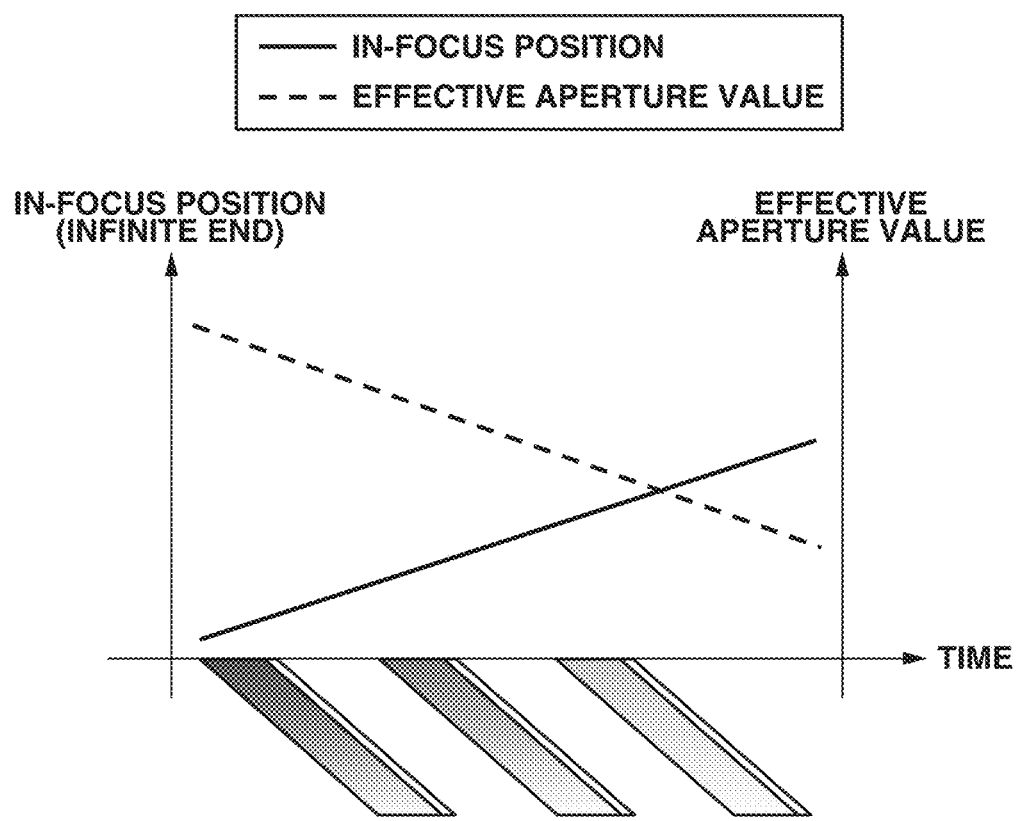
FIG. 4 is a graph illustrating a relationship between changes in effective aperture value due to changes in in-focus position in a plurality of images and the exposure timing without correction of exposure time according to the exemplary embodiment of the present invention.

FIG. 3 is a graph illustrating the relationship between the changes in effective aperture value due to changes in in-focus position and the exposure timing without correction of exposure time according to the present exemplary embodiment. FIG. 4 is a graph illustrating the relationship between the changes in effective aperture value due to changes in in-focus position in a plurality of images and the exposure timing without the correction of exposure time according to the present exemplary embodiment. If the imaging unit 104 performs imaging while continuously moving the in-focus position toward the infinite end using the drive unit 102 during exposure by a rolling shutter, the effective aperture value becomes smaller. Thus, in FIG. 3, an N-th line (the last line) is brighter than the first line in a pixel array, so that uneven luminance occurs in the plane of the image due to changes in in-focus position. Referring to FIG. 4, when a plurality of images for focus stacking is picked up, all of the images exhibit uneven luminance in the plane as illustrated in FIG. 3. If focused areas are extracted from the plurality of images with uneven luminance and are combined into one image, the boundary between combined areas becomes noticeable due to the uneven luminance, thereby causing defects in the composite image.

Figure 5:
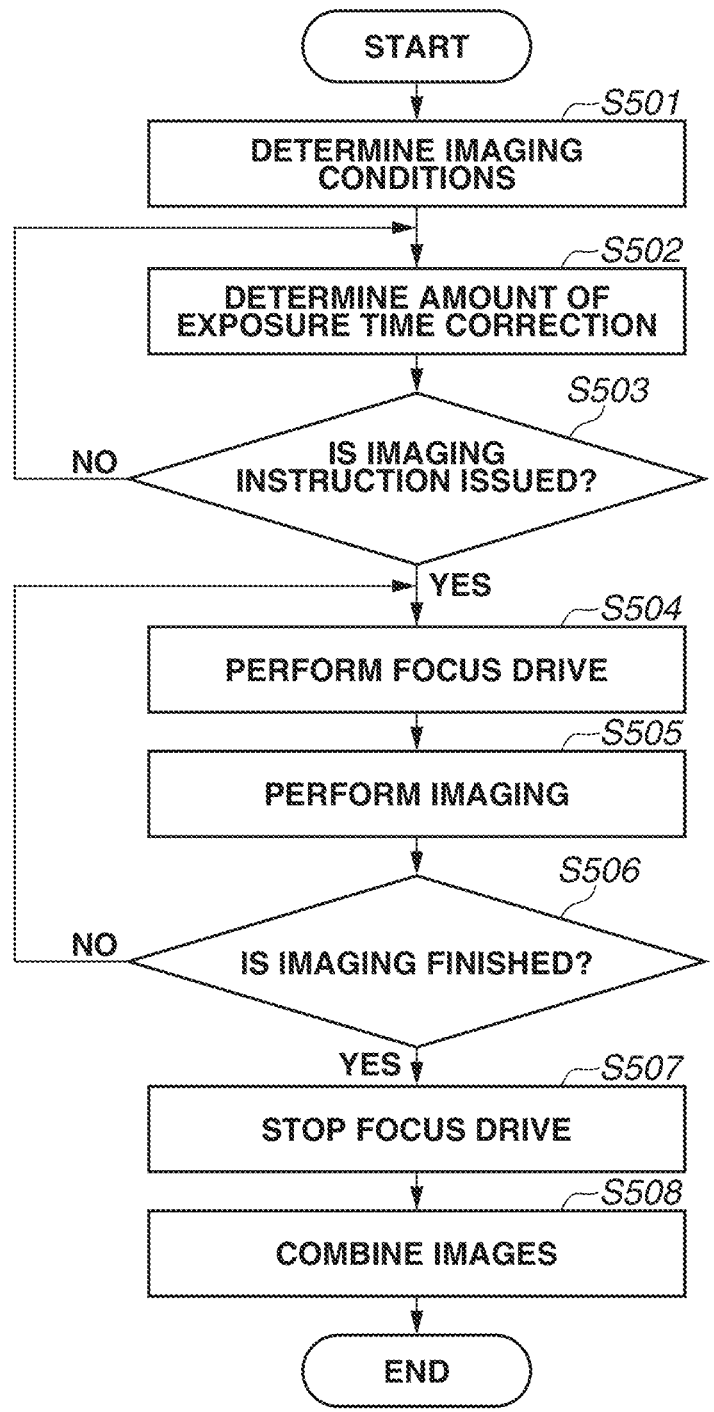
FIG. 5 is a flowchart illustrating a focus stacking process according to the exemplary embodiment of the present invention.

Next, a focus stacking process without the correction of exposure time according to the present exemplary embodiment will be described. FIG. 5 is a flowchart illustrating the focus stacking process according to the present exemplary embodiment.

In step S501, the user operates the operation unit 110 to set parameters for imaging such as exposure settings and focus bracket settings. In response to the user operation, the control unit 101 calculates the exposure time from the shutter speed, and calculates the amount of movement of the in-focus position in an optical axis direction on the basis of the focus bracket settings. Alternatively, the control unit 101 may set the parameters for imaging on the basis of predetermined settings such as default settings, not in response to the user operation immediately before imaging.

In step S502, the control unit 101 calculates the amount of exposure time correction for reducing uneven luminance. Hereinafter, a method for calculating the amount of exposure time correction will be described with reference to the drawing. The control unit 101 calculates the amount of change in the effective aperture value in picking up one image from the amount of movement of the in-focus position set in step S501 and the relationship between the in-focus position and the effective aperture value illustrated in FIG. 2. The information related to the relationship between the in-focus position and the effective aperture value illustrated in FIG. 2 may be stored in advance in the ROM 105 or the like. Alternatively, in the case of a lens mounted camera, the control unit 101 may read information saved in a storage unit of the lens.

Figure 6:
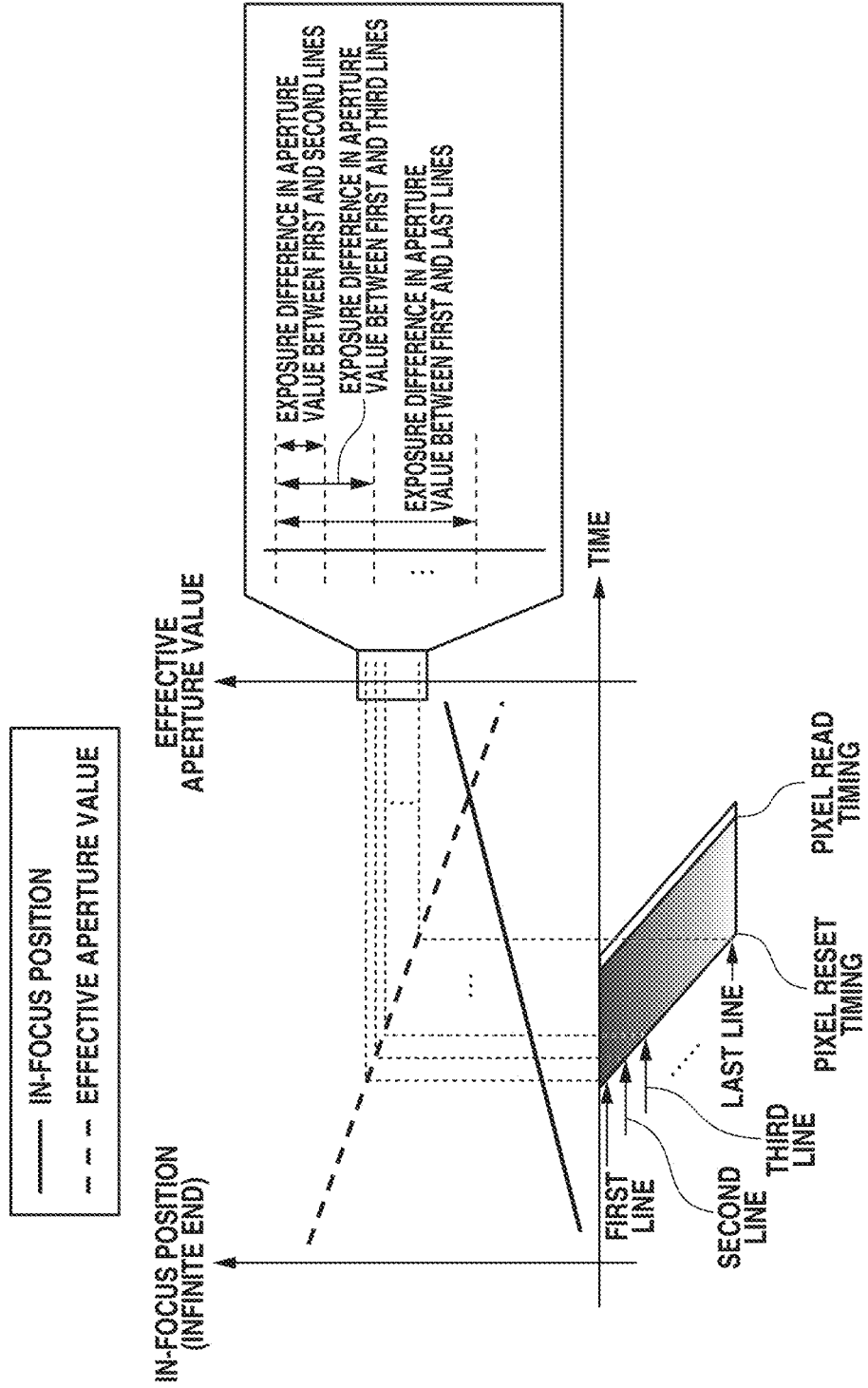
FIG. 6 is a graph illustrating a relationship between a pixel reset timing and an effective aperture value of each line according to the exemplary embodiment of the present invention.

FIG. 6 is a graph illustrating the relationship between a pixel reset timing and the effective aperture value of each line according to the present exemplary embodiment. The control unit 101 calculates a difference in effective aperture value between the first line and the N-th line from the exposure time set in step S501 and the amount of change in the effective aperture value in the optical system 103 in picking up the first image calculated in step S502, and converts the difference in effective aperture value into exposure time. A result obtained through the conversion by the control unit 101 constitutes the amount of exposure time correction for reducing uneven luminance in the plane of the first image. The control unit 101 uses differences in exposure between the first line and the second to N-th lines ("the last line" in FIG. 6) to calculate the amounts of exposure time correction for reducing the differences in exposure between the second to N-th lines and the first line. Then, the control unit 101 applies the calculated amounts of exposure time correction to the respective second to N-th lines and performs imaging for the corrected exposure times, whereby it can be expected to reduce uneven luminance in the one image.

However, if the difference in effective aperture value is extremely small, the effect of correction is considered to be slight. Thus, the control unit 101 may compare the difference in effective aperture value with a predetermined threshold. If the difference in effective aperture value is smaller than or equal to the threshold, the control unit 101 need not perform the exposure time correction.

Figure 7:
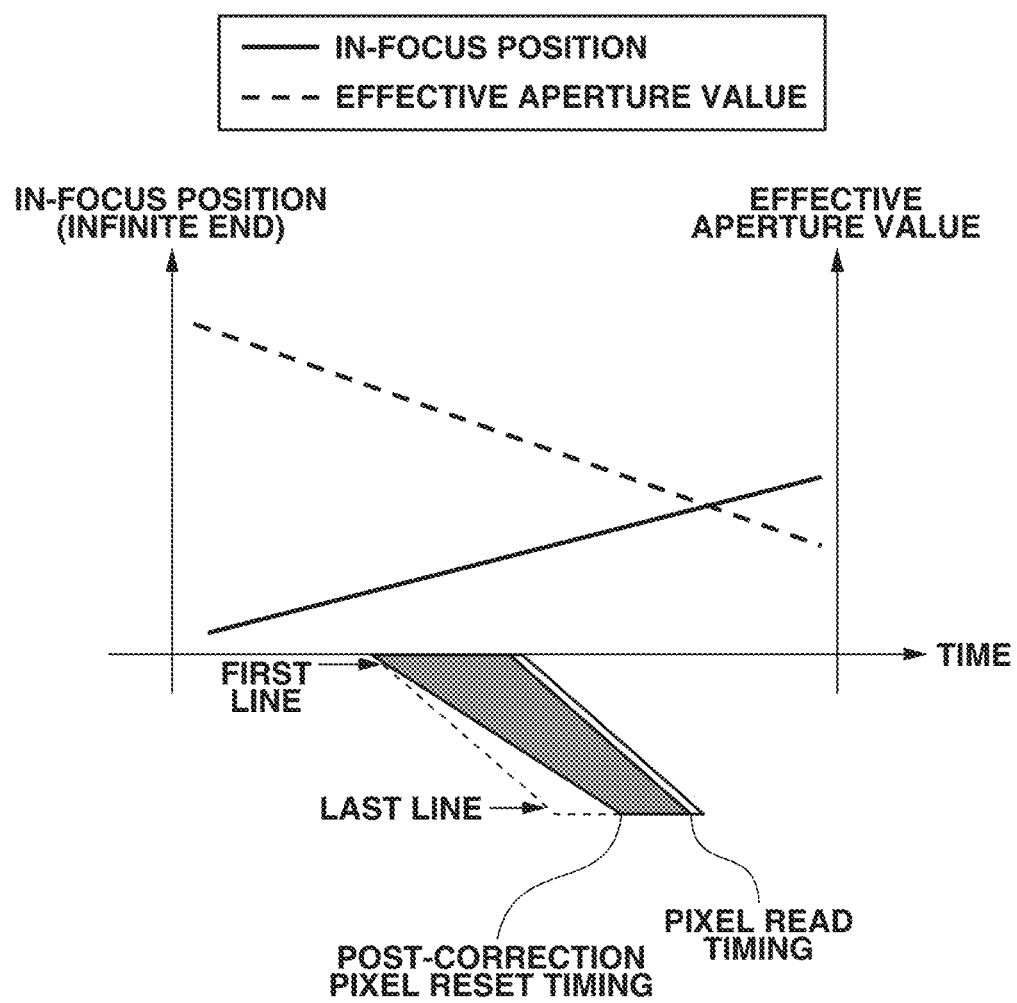
FIG. 7 is a graph illustrating a relationship between the pixel reset timing and the effective aperture value for each line after exposure time correction according to the exemplary embodiment of the present invention.

FIG. 7 is a graph illustrating the relationship between the pixel reset timing and the effective aperture value of each line after the exposure time correction according to the present exemplary embodiment. As illustrated in FIG. 7, the control unit 101 corrects the exposure times to reduce the differences in exposure between the second to N-th lines and the first line so that the exposure times of the respective lines are not identical. In the situation of the present exemplary embodiment as illustrated in FIG. 7, the control unit 101 reduces the exposure times in sequence from the first line to the N-th line, but the present invention is not limited to this. In order to correct the exposure times of the individual lines, the control unit 101 may change the pixel reset timing as illustrated in FIG. 7 or may change the timing for reading the pixels. In FIG. 7, the control unit 101 uses the exposure time of the first line as a reference and corrects the exposure times of the other lines with reference to the effective aperture value of the first line. However, the present invention is not limited to this, and the control unit 101 may use the exposure time of any line as the reference.

Figure 8:
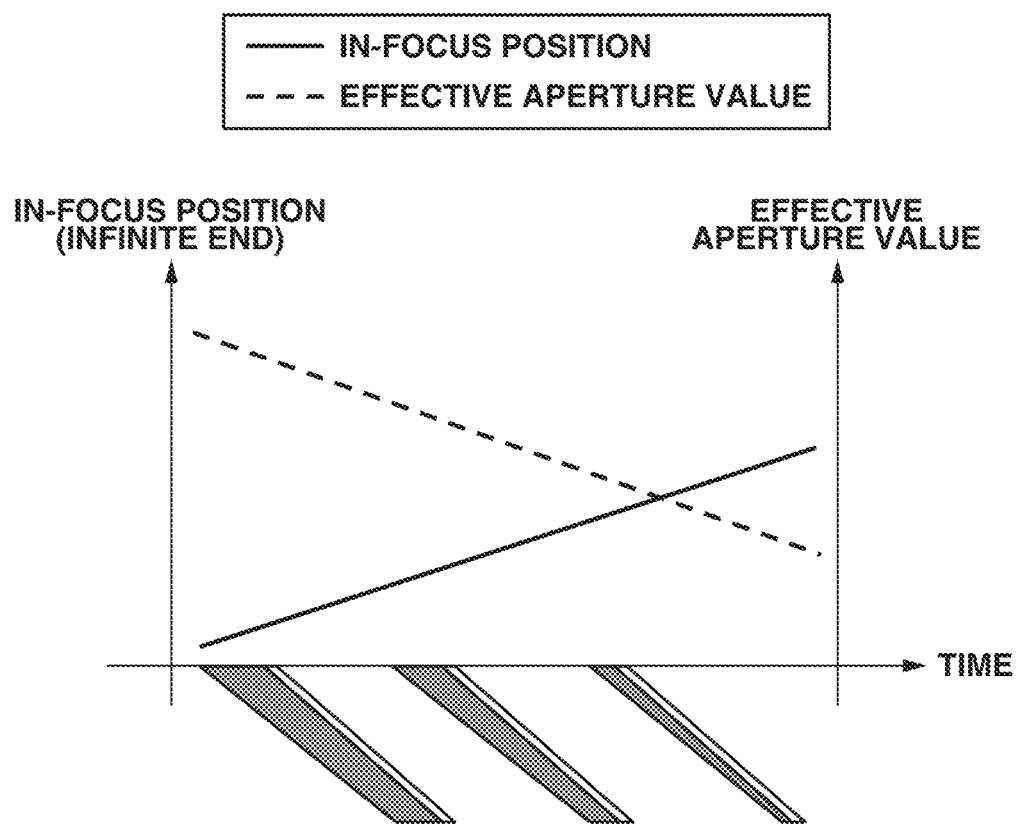
FIG. 8 is a graph illustrating a relationship between the pixel reset timing and the effective aperture value for each line in a plurality of images after exposure time correction according to the exemplary embodiment of the present invention.

FIG. 8 is a graph illustrating the relationship between the pixel reset timing and the effective aperture value of each line in a plurality of images after the exposure time correction according to the present exemplary embodiment. In the case illustrated in FIG. 8, the control unit 101 corrects the exposure times so that the effective aperture values of all the lines in all the images match the effective aperture value of the first line in the first image. By such a correction, it can be expected that uneven luminance in the composite image will be reduced.

In step S503, the control unit 101 detects whether an imaging instruction is issued from the user. If the imaging instruction is issued from the user through operation on the operation unit 110 (YES in step S503), the processing proceeds to step S504. If no imaging instruction is issued from the user (NO in step S503), the processing returns to step S502.

In step S504, the control unit 101 drives the drive unit 102 to perform focus drive for moving the in-focus position to the in-focus position for imaging in next step S505, based on the imaging conditions set in step S501.

In step S505, the imaging unit 104 performs imaging at the in-focus position in the optical axis direction set in step S504 using the exposure times corrected by the amount of correction determined in step S502. As described above, the in-focus position is moved (the focus drive is not stopped) during the imaging according to the present exemplary embodiment. As illustrated in FIG. 8, in the present exemplary embodiment, the imaging is performed with movement in the in-focus position while correcting the exposure times.

In step S506, the control unit 101 determines whether the imaging is finished. Here, as a criterion for determination on whether the imaging is finished, the control unit 101 uses, for example, a condition that a predetermined number of picked-up images has been reached. Otherwise, the control unit 101 uses, for example, a condition that a predetermined capacity for saving images has been reached. Otherwise, the control unit 101 uses, for example, a condition that a predetermined focus range has been reached.

After the end of the imaging (YES in step S506), in step S507, the drive unit 102 stops the focus drive.

In step S508, the image processing unit 107 performs a focus stacking process on the picked-up images to generate a composite image. An example of a method for focus stacking will be described. First, the control unit 101 calculates the amount of position gap between two images to be combined. An example of a calculation method will be described below. First, the control unit 101 sets a plurality of blocks to one of the images. The control unit 101 desirably sets the blocks of the same size. Next, the control unit 101 sets search ranges larger in size than the blocks to the other image at positions corresponding to the set blocks. Finally, the control unit 101 calculates corresponding points in the search ranges in the other image so that the sum of absolute difference (hereinafter, referred to as SAD) in luminance with the set blocks becomes the smallest. A system control unit 210 calculates position gaps as vectors from the centers of the set blocks and the corresponding points. In calculating the corresponding points described above, the system control unit 210 may use, instead of SAD, the sum of squared difference (hereinafter, referred to as SSD), or normalized cross correlation (hereinafter, referred to as NCC). Next, the control unit 101 calculates transform coefficients from the amount of position gap. As the transform coefficients, the control unit 101 uses, for example, projective transform coefficients. However, the transform coefficients are not limited to the projective transform coefficients but may also be affine transform coefficients or simplified transform coefficients for horizontal and vertical shifts. Then, the image processing unit 107 calculates contrast values for the images after alignment. As an example of a method for calculating the contrast values, the image processing unit 107 first calculates luminance Y from color signals Sr, Sg, and Sb of pixels by using the following (Formula 1).

$$Y = 0.299Sr + 0.587Sg + 0.114Sb \qquad \text{Formula (1)}$$

Next, the image processing unit 107 calculates contrast values I by using a Sobel filter to a matrix L of luminance Y of 3×3 pixels as described in the following Formulas (2), (3), and (4):

[Math. 1]

$$I_h = \begin{pmatrix} -1 & 0 & 1 \\ -2 & 0 & 2 \\ -1 & 0 & 1 \end{pmatrix} \cdot L \qquad \text{Formula (2)}$$

[Math. 2]

$$I_h = \begin{pmatrix} -1 & 0 & 1 \\ -2 & 0 & 2 \\ -1 & 0 & 1 \end{pmatrix} \cdot L \qquad \text{Formula (3)}$$

[Math. 3]

$$I = \sqrt{I_h^2 + I_v^2}. \qquad \text{Formula (4)}$$

The above-described method for calculating the contrast values is a mere example. For example, an edge detection filter such as a Laplacian filter or a band pass filter passing a predetermined band may be used instead. Then, the image processing unit 107 generates a composite map. As a method for generating the composite map, the image processing unit 107 compares the contrast values of the pixels at the same position in the individual images, and sets the combining proportion of pixels with the highest contrast value to 100% and sets the combining proportion of other pixels at the same position to 0%. The image processing unit 107 sets such combining proportions at all the positions in the images.

Lastly, the image processing unit 107 replaces the pixels based on the composite map to generate the composite image. If the thus calculated combining proportion between the adjacent pixels changes from 0% to 100% (or changes from 100% to 0%), a boundary between combined areas becomes noticeably unnatural. Thus, a filter with a predetermined number of pixels (taps) is applied to the composite map so that the combining proportion does not sharply change between the adjacent pixels.

In the present exemplary embodiment, by performing imaging while moving the in-focus position during exposure, it is possible to obtain a focus-stacked image in which defects in the boundary between combined areas caused by uneven luminance are reduced, with a reduced imaging time.

In the present exemplary embodiment described above, the digital camera 100 performs the focus stacking as a precondition. In many cases, besides the function of focus stacking, the digital camera 100 also has a function of picking up one image and recording the picked-up one image. In another exemplary embodiment for carrying out the present invention, whether to correct the exposure time is determined depending on whether to record one image or perform the focus stacking.

If the digital camera 100 picks up one image without performing the focus stacking while moving the in-focus position during exposure, uneven luminance will occur in the plane of the one image. However, the uneven luminance in the plane of the one image is smaller than the uneven luminance in the composite image having undergone the focus stacking. Thus, in the case where the digital camera 100 performs image pickup while moving the in-focus position during exposure, the digital camera 100 may not correct the exposure time as described above when recording one image only, and may correct the exposure time as described above when performing the focus stacking.

The above description of the exemplary embodiment has been given based on a personal digital camera. However, the exemplary embodiment is also applicable to a mobile device, a smartphone, or a network camera connected to a server, as far as they have the function of focus stacking. Alternatively, some of the above-described processes may be performed by the mobile device, the smartphone, or the network camera connected to a server.

Embodiment(s) of the present invention can also be realized by a process of supplying a program for implementing one or more functions of the above-described exemplary embodiments to a system or an apparatus via a network or a storage medium, and reading and executing the program by one or more processors in a computer of the system or the apparatus. The present invention can also be realized by a circuit (for example, an application specific integrated circuit (for example, ASIC)) that implements one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-194436, filed Nov. 24, 2020, which is hereby incorporated by reference herein in its entirety.

What is claimed is:

1. An image pick up apparatus comprising:
an image sensor configured to pick up an image while changing an in-focus position during pickup of the image;
at least one memory configured to store instructions; and
at least one processor coupled to the at least one memory and configured to execute the instructions to:
perform a correction of a difference in exposure resulting from a change in the in-focus position while one image is picked up and not perform the correction if the difference in exposure resulting from the change in the in-focus position is smaller than or equal to a predetermined threshold.

2. The image pick up apparatus according to claim 1, wherein the at least one processor further executes the instructions to:
perform the correction by changing an exposure time while the image sensor picks up the one image.

3. The image pick up apparatus according to claim 2, wherein the at least one processor further executes the instructions to:
change the exposure time by changing at least one of a timing for resetting each pixel and a timing for reading each pixel of the image sensor.

4. The image pick up apparatus according to claim 1, wherein the at least one processor further executes the instructions to:
read an image signal in sequence from each portion of the image sensor, and
perform the correction to make luminance of the image signal from the portion uniform.

5. The image pick up apparatus according to claim 4, wherein an exposure time of pixels included in the portion of the image sensor are the same.

6. The image pick up apparatus according to claim 4, wherein the portion of the image sensor is a line of a pixel array of an imaging element.

7. The image pick up apparatus according to claim 1, wherein the image sensor picks up a plurality of images different in in-focus position, and
wherein the at least one processor further executes the instructions to:
make a difference in exposure between the plurality of images after the correction smaller than the difference before the correction.

8. The image pick up apparatus according to claim 7, wherein the at least one processor further executes the instructions to:
perform combining of the plurality of images to generate a composite image,
wherein a depth of field of the composite image is deeper than a depth of field of each of the plurality of images.

9. The image pick up apparatus according to claim 8, wherein the at least one processor further executes the instructions to:
perform the combining by extracting a focused area from each of the plurality of images.

10. The image pick up apparatus according to claim 7, wherein the at least one processor further executes the instructions to:
perform the correction based on an effective aperture value in picking up each of the plurality of images.

11. The image pick up apparatus according to claim 7, wherein the at least one processor further executes the instructions to:
correct an exposure time to match effective aperture values of the plurality of images with an effective aperture value of any one line in any one image of the plurality of images as a reference.

12. The image pick up apparatus according to claim 11, wherein the at least one processor further executes the instructions to:
use an effective aperture value of a first line in a first image of the plurality of images as the reference.

13. The image pick up apparatus according to claim 1, further comprising an optical system including a rolling shutter,
wherein the image sensor performs image pickup by receiving light through the optical system.

14. The image pick up apparatus according to claim 1, wherein the image sensor picks up a plurality of images different in in-focus position, and
wherein the at least one processor further executes the instructions to:
in a case where combining of the plurality of images is performed to generate a composite image, perform the correction, and
in a case where the combining is not performed, not perform the correction.

15. The image pick up apparatus according to claim 14, wherein a depth of field of the composite image is deeper than a depth of field of each of the plurality of images.

16. The image pick up apparatus according to claim 14, wherein a difference in exposure between the plurality of images after the correction is smaller than the difference before the correction.

17. An image pick up method comprising:
picking up an image while continuously changing an in-focus position during pickup of the image; and
performing correction of a difference in exposure resulting from a change in the in-focus position while one image is picked up in the picking up and not perform the correction if the difference in exposure resulting from the change in the in-focus position is smaller than or equal to a predetermined threshold.

18. A non-transitory computer-readable storage medium which stores a program for causing a computer of an apparatus to execute an image pick up method according to claim 17.

19. An image pick up apparatus comprising:
an image sensor configured to pick up a plurality of images different in in-focus position;
at least one memory configured to store instructions; and
at least one processor coupled to the at least one memory and configured to execute the instructions to:
determine whether to perform a correction of a difference in exposure resulting from a change in the in-focus position while one image is picked up,
in a case where combining of the plurality of images is performed to generate a composite image, perform the correction, and
in a case where the combining is not performed, not perform the correction.

20. An image pick up method comprising:
picking up a plurality of images different in in-focus position;
determining whether to perform a correction of a difference in exposure resulting from a change in the in-focus position while one image is picked up,
in a case where combining of the plurality of images is performed to generate a composite image, performing the correction, and
in a case where the combining is not performed, not performing the correction.

21. A non-transitory computer-readable storage medium which stores a program for causing a computer to execute an image pick up method, the method comprising:
picking up a plurality of images different in in-focus position;
determining whether to perform a correction of a difference in exposure resulting from a change in the in-focus position while one image is picked up,
in a case where combining of the plurality of images is performed to generate a composite image, performing the correction, and
in a case where the combining is not performed, not performing the correction.

\* \* \* \* \*